US012712849B2

(12) United States Patent
Arif et al.

(10) Patent No.: US 12,712,849 B2
(45) Date of Patent: Aug. 18, 2026

(54) DYNAMIC RATE LIMITING FOR DIGITAL TRAFFIC

(71) Applicant: eBay Inc., San Jose, CA (US)

(72) Inventors: Mustafa Syed Arif, Wylie, TX (US); Swanand Abhyankar, Milpitas, CA (US); Yogesh Patil, Davis, CA (US); Manish Mohan, San Jose, CA (US); Harish Moodalbail Ganeshmurthy, Hayward, CA (US); Raghavendar Guddeti, San Jose, CA (US); Sandeep Kumar, Fremont, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/590,090

(22) Filed: Feb. 28, 2024

(65) Prior Publication Data

US 2025/0274434 A1 Aug. 28, 2025

(51) Int. Cl.
*H04L 29/06* (2006.01)
*G06F 9/54* (2006.01)
(Continued)

(52) U.S. Cl.
CPC .......... *H04L 63/0263* (2013.01); *G06F 9/547* (2013.01); *H04L 47/25* (2013.01); *H04L 63/0281* (2013.01); *H04L 63/1425* (2013.01)

(58) Field of Classification Search
CPC . H04L 63/0263; H04L 47/25; H04L 63/0281; H04L 63/1425; G06F 9/547
See application file for complete search history.

(56) References Cited

U.S. PATENT DOCUMENTS 8,023,482 B2 9/2011 Gong et al.
8,667,056 B1 3/2014 Proulx et al.
(Continued)

FOREIGN PATENT DOCUMENTS

EP 3226509 B1 11/2019
WO WO-2012164336 A1 * 12/2012 .......... G06F 21/552

OTHER PUBLICATIONS

Wong et al., "On the Effectiveness of Rate Limiting Mechanisms", Parallel Data Laboratory, Carnegie Mellon University, Mar. 2005, 21 pages.
(Continued)

*Primary Examiner* — Ka Shan Choy
(74) *Attorney, Agent, or Firm* — Shook, Hardy & Bacon L.L.P.

(57) ABSTRACT

The technology described herein relates to systems, methods, and computer storage media, among other things, for generating recommendations corresponding to whether requests (e.g., transmitted by computing devices) are malicious network traffic. For example, the recommendations can be generated using various historical and current network traffic trends (e.g., associated with a particular application programming interface). As another example, the recommendations can be generated based on particular models. Based on the generated recommendation, dynamic rate limiting rules can be applied for determining whether a request is malicious network traffic. Based on determining the request is malicious network traffic, the request (and additional requests associated with that particular request) can be blocked.

18 Claims, 5 Drawing Sheets

(51) Int. Cl.
*H04L 9/40* (2022.01)
*H04L 47/25* (2022.01)

(56) References Cited

U.S. PATENT DOCUMENTS

| | | | | |
|---|---|---|---|---|
| 10,469,404 | B1 | 11/2019 | Mao et al. | |
| 10,644,978 | B2 | 5/2020 | Dillon et al. | |
| 11,075,923 | B1 * | 7/2021 | Srinivasan | H04L 67/306 |
| 2017/0279773 | A1 | 9/2017 | Koripella et al. | |
| 2018/0146395 | A1 | 5/2018 | Kotecha et al. | |
| 2020/0028788 | A1 * | 1/2020 | Chen | H04L 47/25 |
| 2021/0306217 | A1 | 9/2021 | Paiva et al. | |
| 2021/0400080 | A1 | 12/2021 | Kaidi | |
| 2023/0300149 | A1 * | 9/2023 | DiVincenzo | H04L 63/1441 726/23 |
| 2023/0412565 | A1 * | 12/2023 | Mankala | H04L 47/2483 |
| 2025/0209170 | A1 * | 6/2025 | Wang | G06F 21/566 |

OTHER PUBLICATIONS

European Search Report received for Patent Application No. 25160328.8, mailed on Mar. 24, 2025, 10 pages.
Intention to Grant received for European Patent Application No. 25160328.8, mailed on Jan. 2, 2026, 6 pages.

* cited by examiner

200

202 Client periodic requests encrypted metadata

206 Metadata Generator

204 Recommendation System

208 Metadata Cache (with recommendation)

Recommendation

210 Traffic Proxy encrypted metadata

212 Dynamic Rate Limiter Based on Receommendation

214A API 1

214B API 2

214N API N

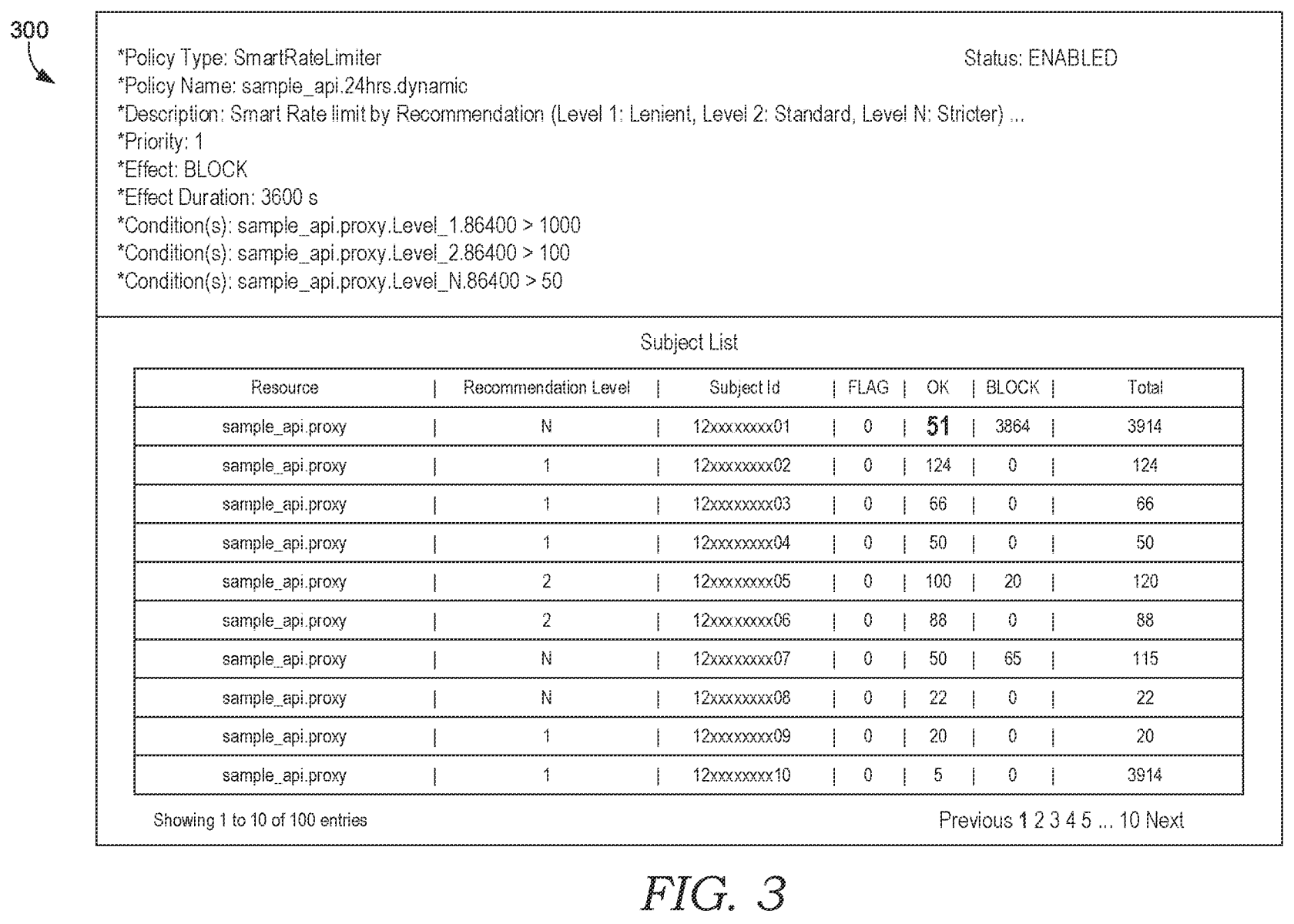

300

*Policy Type: SmartRateLimiter Status: ENABLED
*Policy Name: sample_api.24hrs.dynamic
*Description: Smart Rate limit by Recommendation (Level 1: Lenient, Level 2: Standard, Level N: Stricter) ...
*Priority: 1
*Effect: BLOCK
*Effect Duration: 3600 s
*Condition(s): sample_api.proxy.Level_1.86400 > 1000
*Condition(s): sample_api.proxy.Level_2.86400 > 100
*Condition(s): sample_api.proxy.Level_N.86400 > 50

Subject List

| Resource | Recommendation Level | Subject Id | FLAG | OK | BLOCK | Total |
|---|---|---|---|---|---|---|
| sample_api.proxy | N | 12xxxxxxxx01 | 0 | **51** | 3864 | 3914 |
| sample_api.proxy | 1 | 12xxxxxxxx02 | 0 | 124 | 0 | 124 |
| sample_api.proxy | 1 | 12xxxxxxxx03 | 0 | 66 | 0 | 66 |
| sample_api.proxy | 1 | 12xxxxxxxx04 | 0 | 50 | 0 | 50 |
| sample_api.proxy | 2 | 12xxxxxxxx05 | 0 | 100 | 20 | 120 |
| sample_api.proxy | 2 | 12xxxxxxxx06 | 0 | 88 | 0 | 88 |
| sample_api.proxy | N | 12xxxxxxxx07 | 0 | 50 | 65 | 115 |
| sample_api.proxy | N | 12xxxxxxxx08 | 0 | 22 | 0 | 22 |
| sample_api.proxy | 1 | 12xxxxxxxx09 | 0 | 20 | 0 | 20 |
| sample_api.proxy | 1 | 12xxxxxxxx10 | 0 | 5 | 0 | 3914 |

Showing 1 to 10 of 100 entries Previous 1 2 3 4 5 ... 10 Next

*FIG. 3*

DYNAMIC RATE LIMITING FOR DIGITAL TRAFFIC

BACKGROUND

Static rate limiting can be used to control a rate at which electronic requests can be sent or received by a controller connected to a network providing communications (e.g., radio frequencies). The static rates can be set by a scheduler. During peak times, request rates can exceed a capacity for a queue. Memory and central processing units can determine scalability and precision. Rate limiting can reduce strain on web servers.

SUMMARY

At a high level, aspects described herein relate to systems, methods, and computer storage media for, among other things, blocking requests (e.g., requests corresponding to an application programming interface (API)) that are transmitted over a network based on recommendations generated by an auxiliary recommendation system. The recommendation generated by the auxiliary recommendation system may indicate whether the request is malicious network traffic. In some embodiments, the recommendation can be generated based on historical network traffic associated with the API, current network traffic associated with the API, other types of network traffic associated with the API, other types of network traffic associated with the API and other APIs, or one or more combinations thereof.

In some embodiments, the auxiliary recommendation system can be part of a malicious network traffic management engine that also includes a dynamic rate limiter that is separate from the auxiliary recommendation system. For example, the malicious network traffic management engine can determine whether the request is malicious network traffic by applying a dynamic rate limiting rule to the recommendation using the dynamic rate limiter. In some embodiments, the rate limiting rule can be applied based on receiving an indication from a computing device associated with the API (e.g., the computing device setting the rate limiting rule for particular types of requests). In some embodiments, the rate limiting rule can be adjusted by the computing device associated with the API. In some embodiments, the dynamic rate limiting rule can be adjusted based on the current network traffic associated with the API in which the recommendation was generated for.

The dynamic rate limiting rule can be applied to the recommendation, in some embodiments, after caching an encryption of the recommendation. For instance, the recommendation may be encrypted in metadata (e.g., generated by a recommendation metadata encryption system that is different than the auxiliary recommendation system), cached for a period of time that is based on a particular network traffic flow, and then received by the dynamic rate limiter for application of a rate limiting rule for determining whether the request is malicious network traffic. In some embodiments, the dynamic rate limiting rule is applied based on the metadata including the encrypted recommendation being transmitted to a proxy layer. In some embodiments, the dynamic rate limiting rule is applied based on decrypting the encrypted recommendation.

By way of example, in some embodiments, the request may be transmitted by a computing device (e.g., a smartphone, laptop, internet of things device, etc.) via an interface with a service application that is associated with the API. As another example, the service application can include logic or a set of instructions configured to perform one or more operations as a standalone application or a micro-service providing functions as part of a distributed application. In some embodiments, the API and the one or more other APIs in which the auxiliary recommendation system provides request recommendations for may correspond to different service applications or platforms (e.g., a personal banking application, a geographic information system platform, an authentication service application, etc.). In some embodiments, different dynamic rate limiting rules may be applied for different APIs or applications in which the request corresponds to.

Based on determining that a request is malicious network traffic, the methods and systems herein (e.g., the malicious network traffic management engine) can block the request and additional requests from a computing device or user account in which the request was transmitted. In other instances, based on determining that a request is not malicious network traffic, the methods and systems herein can provide the request and additional requests, from a computing device or user account in which the non-malicious network traffic request was transmitted, to the corresponding API or application server. In some embodiments, recommendations can be generated by the auxiliary recommendation system in real time for various requests corresponding to one or more APIs, and the auxiliary recommendation system can continuously update the historical and current network traffic (e.g., within a threshold period of time) used for generating the request recommendations.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 illustrates an example user interface for managing network traffic based on the generated network traffic recommendations, in accordance with an embodiment described herein;

DETAILED DESCRIPTION

Figure 1:
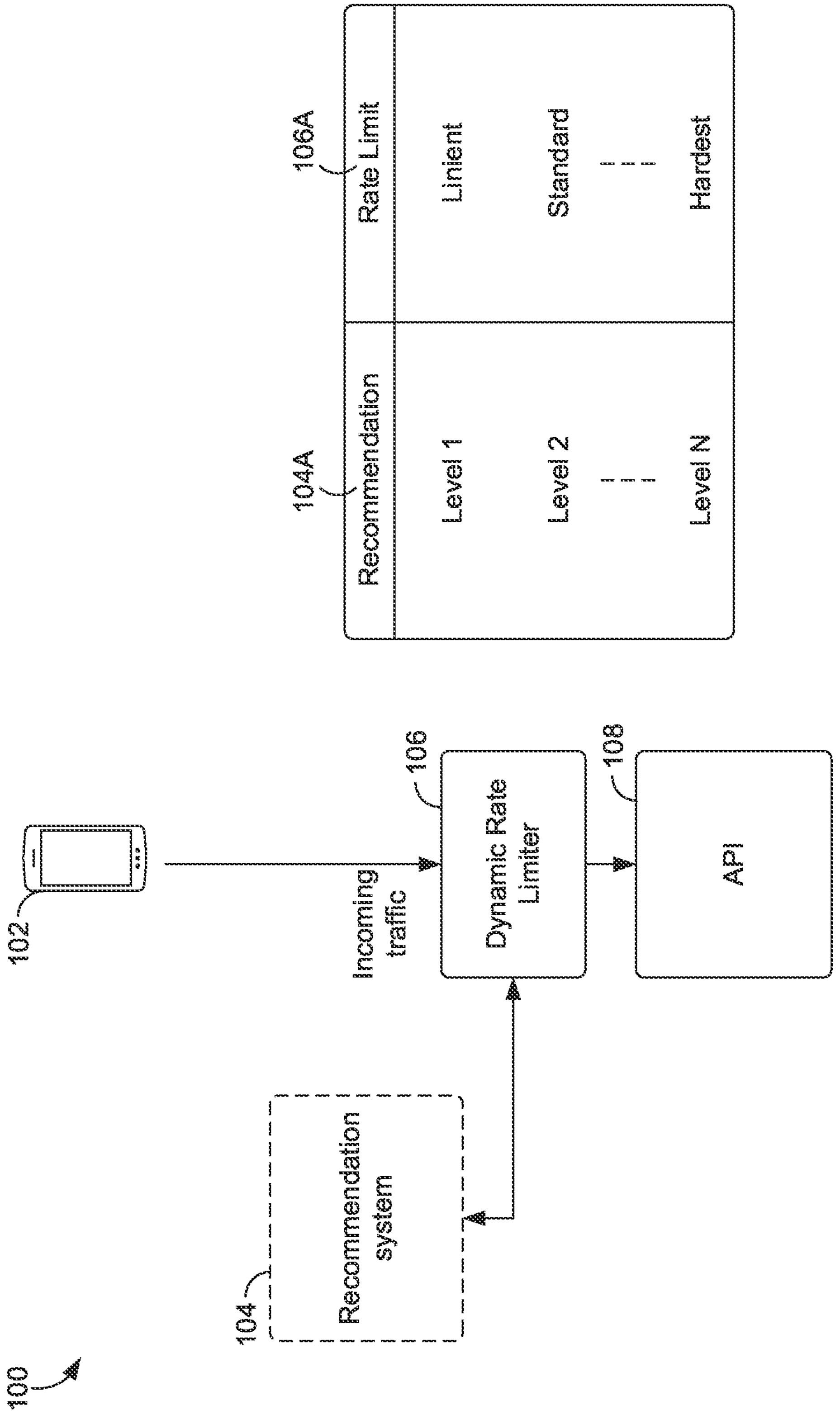
FIG. 1 illustrates an example block diagram for generating network traffic recommendations and applying a dynamic rate limiting rule, in accordance with an embodiment described herein.

General static rate limiting techniques for predefined limits on incoming requests and data transmissions have been used to control traffic flow, allocate resources, and manage network bandwidth. Static rate limiting techniques have some shortcomings, such as mistakenly restricting legitimate users or other types of legitimate traffic (e.g., during a spike in network traffic), false negative detections that result in illegitimate users or traffic types being permitted to perform various activities, service disruptions or delays based on the false negative detections or based on the rate limiting metrics being too stringent, service disruptions or delays based on false positives of legitimate users, scalability limitations when handling an increased demand, lack of flexibility when attempting to adapt to or handle different traffic patterns, failure in detecting new methods being performed by illegitimate users to thwart detection, and so forth. These shortcomings of these static rate limiting techniques can impact both service platform providers and users.

It is desirable (e.g., for both service platform providers and users of those services) to have network management techniques that control traffic flow, allocate resources, and block appropriate network traffic without restricting legitimate users or other types of legitimate traffic, without restricting legitimate users or other types of legitimate traffic from performing various activities, without failing to identify risky users and other types of risky traffic and quickly restricting those electronic activities, without causing additional service disruptions and delays based on inflexible rate limiting metrics, without encountering scalability limitations, etc. For example, the technology discussed herein can perform enhanced network management techniques that improve upon these shortcomings by, for example, blocking or transmitting particular requests upon determining whether the request is malicious network traffic based on utilizing recommendations provided by an auxiliary recommendation system that is part of or in communication with a malicious network traffic management engine.

Furthermore, the technology described herein can also reduce the physical wear on storage components, since encrypted recommendations provided by the auxiliary recommendation system can be cached based on traffic associated with a proxy layer in such a way that the performance of the malicious network traffic management engine is not compromised and latencies are reduced. (Read/write heads, for example, are very mechanical in nature and subject to information access errors because of the precise movements they must make when locating cached data. Such information access errors are more likely to occur when there is excessive computer I/O due to data being stored without consideration of the corresponding network traffic. Moreover, each repetitive input (e.g., searching for particular stored data without consideration of the corresponding network traffic) also requires more memory operations, thereby unnecessarily consuming storage space.) In addition, by reducing computer component and operational latencies by incorporating the techniques described herein, both user experiences (e.g., user device experiences) and application services (e.g., service applications, such as an online marketplace, other types of service applications, etc.) are improved.

The term "user" as discussed herein may correspond to a human, a particular entity, a robot, another particular machine, etc.

Having provided some example scenarios, a technology suitable for performing these examples is described in more detail with reference to the drawings. It will be understood that additional systems and methods for providing network management services can be derived from the following description of the technology.

Turning now to FIG. 1, FIG. 1 illustrates an example block diagram 100 for generating network traffic recommendations in which implementations of the present disclosure may be employed. In particular, FIG. 1 illustrates a high-level architecture of example block diagram 100 having components in accordance with implementations of the present disclosure. The components and architecture of FIG. 1 are intended as examples, as noted toward the end of the Detailed Description.

Example block diagram 100 includes computing device 102, recommendation system 104 and example recommendation levels 104A, dynamic rate limiter 106 and example rate limits 106A, and example application programming interface (API) 108. Other embodiments of this example block diagram may include additional APIs, additional computing devices, other types of example recommendations, other types of rate limits, etc.

The computing device 102 may be a device that has the capability of using a network, and may also be referred to as a "computing device," "mobile device," "client device," "user equipment," "communication device," or "UE." A computing device, in some embodiments, may take on a variety of forms, such as a PC, a laptop computer, a tablet, a mobile phone, a PDA, a server, or any other device that is capable of communicating with other devices (e.g., by transmitting or receiving a signal) using a network. Broadly, the computing device 102 can include computer-readable media storing computer-executable instructions executed by at least one computer processor. One example of the computing device 102 includes computing device 500 described herein with reference to FIG. 5. The computing device 102 may be operated by a user, such as one or more of a person, machine, robot, other user device operator, or one or more combinations thereof.

In embodiments, the dynamic rate limiter 106 can communicate with the recommendations system 104, computing device 102, and API 108 over a network, such as a local area network (LAN), a wide area network (WAN), a mesh network, a hybrid network, networks, or one or more combinations thereof. In some embodiments, the recommendation system 104 may communicate with the dynamic rate limiter 106 over a network, such as the Internet another public or private network. The computing device 102 and API 108 can be connected to a network or portion thereof for communications with the recommendation system 104 or dynamic rate limiter 106 via a network interface. Other embodiments of example block diagram 100 may include additional computing devices or network nodes that are capable of communicating (e.g., transmitting or receiving) with the recommendation system 104.

Generally, the recommendation system 104 may be an auxiliary recommendation system that is separate from the dynamic rate limiter 106. In some embodiments, the recommendation system can include one or more servers (e.g., one or more computing devices) that implement one or more functional aspects corresponding to block diagram 100. In embodiments, the recommendation system 104 represents a backend or server-side device. In some embodiments, the recommendation system 104 can include one or more edge servers. In some embodiments, the dynamic rate limiter 106 may include one or more servers or one or more edge servers representing a backend or server-side device.

Figure 5:
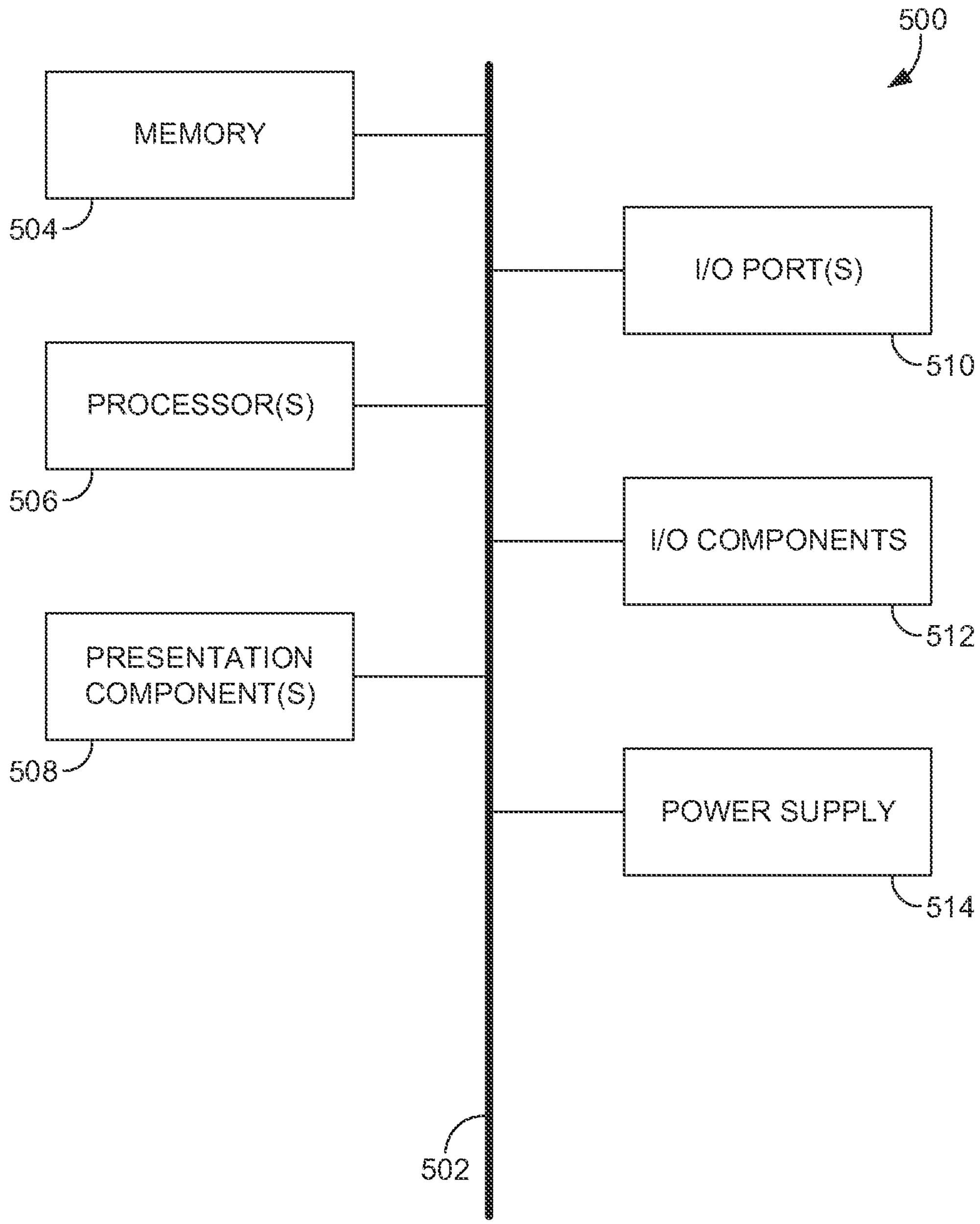
FIG. 5 is an example computing device suitable for implementing the described technology, in accordance with an embodiment described herein.

In embodiments, one or more servers of the recommendation system 104 or the dynamic rate limiter 106 can comprise computing devices, such as computing device 500 of FIG. 5. In some embodiments, the one or more servers of the recommendation system 104 may include a distributed computing environment encompassing multiple computing devices located at the same physical geographical location. In some embodiments, the one or more servers of the dynamic rate limiter 106 may include a distributed computing environment encompassing multiple computing devices located at the same physical geographical location. In some embodiments, the one or more servers of the recommendation system 104 and the dynamic rate limiter 106 may have a computing environment located at the same physical geographical location.

In embodiments, one or more servers of the recommendation system 104 may have multiple servers at different physical geographical locations. In embodiments, one or more servers of the dynamic rate limiter 106 may have multiple servers at different physical geographical locations. In some embodiments, the recommendation system 104 and the dynamic rate limiter 106 can connect to the same database or may each have one or more of their own databases.

In embodiments, computing device 102 is a client-side or front-end device and the recommendation system 104 and the dynamic rate limiter 106 are backend or server-side computing devices. It will be understood that some implementations of the technology will comprise either a client-side or front-end computing device, a backend or server-side computing device, or both executing a combination of functions (e.g., receiving the request(s) from the computing device 102, transmission of recommendations, etc.).

In embodiments, one or more of the dynamic rate limiter 106 and recommendation system 104 are capable of receiving computing device requests (e.g., an API request, an HTTP request, an authentication request (e.g., login attempt, password reset, etc.), a file upload, a file transfer, an email request, a request for geolocation information, a payment verification request, a resource access request, an API rate limiting request, a domain name system request, a search request corresponding to the API 108, other types of requests, etc.) and coordinating, monitoring, or otherwise managing fulfillment (e.g., blocking or not blocking) of those requests (e.g., sometimes through other servers).

In embodiments, the recommendation system 104 can generate a recommendation corresponding to whether one or more requests from the computing device 102 or other computing devices are malicious network traffic (e.g., based on historical or current network traffic). For example, determining whether the one or more requests are malicious network traffic may correspond to malicious network traffic including one or more of web scraping, brute-force attack, automated bot traffic, denial of service attack, domain name server amplification attack, credential stuffing, large numbers of requests to the API to overwhelm the one or more servers corresponding to the API, account enumeration for gaining access to an account, cross-site scripting attacks (e.g., injections of malicious scripts into a web page), structured query language injections targeting input fields to manipulate a database or retrieve database information, zero-day exploits targeting software vulnerability, phishing attacks, man-in-the-middle attacks to intercept sensitive or private communications, session hijacking to gain unauthorized access to a user account, clickjacking, other types of malicious network traffic, or one or more combinations thereof.

In embodiments, the recommendation system 104 can generate the recommendation as to whether the one or more requests are malicious network traffic using one or more models (e.g., machine learning model(s), neural network(s), decision tree(s), supervised learning algorithm(s) for classification and regression, clustering model(s), dimensionality reduction model(s) markov model(s), fuzzy logic model (s), reinforcement learning model(s), other types of model (s), one or more combinations thereof, etc.). For example, the one or more models can use historical network traffic data, current network traffic data, or one or more combinations thereof, that correspond to the API 108, other APIs, the dynamic rate limiter 106, the recommendation system 104, an external database, another system, or one or more combinations thereof.

In some embodiments, the historical network traffic data or current network traffic data can include login attempts and corresponding user names, email addresses, IP addresses, other types of user device identifiers, login request rates associated with a particular user device or user account, failed login attempts, login attempts from different user devices, email transmission rates from a particular user device, file upload or download rates, file transfer rates, geolocation information request rates, payment verification request rates, resource access request rates, API rate limiting request rates, domain name system request rates, search request rates, rapid system interaction changes, unexpected system interaction changes, frequent and rapid password resets for a particular user account, an account registration creation rate from a particular user device, high transaction requests from a particular user device within a threshold period of time, high search query requests from a particular user device within a threshold period of time, high for submission requests from a particular user device within a threshold period of time, a registration rate associated with a threshold number of user devices, Completely Automated Public Turing test to tell Computers and Humans Apart (CAPTCHA) verification requests within a threshold period of time, user session requests within a threshold period of time, social media interaction rates within a threshold period of time, advertisement clicks within a threshold period of time, other types of historical network traffic data or current network traffic data, or one or more combinations thereof.

In some embodiments, the historical network traffic data or current network traffic data that the recommendation system 104 can use for generating a recommendation may include click logs (e.g., for a particular advertisement that includes time stamps, IP addresses, other user device information associated with particular clicks, referral sources that initiated the user clicking the advertisement, etc.), user interaction logs (e.g., for an email server, banking platform, trading platform, e-commerce platform, geolocation server, or ad platform including clicks, impressions, conversions, etc.), a user device reputation database, a geolocation database, an advertisement fraudulent detection platform, a user behavior analytics database, a device fingerprint database, other types of stored historical network traffic data or current network traffic data, or one or more combinations thereof. In embodiments, the recommendation system 104 can use detected abnormal or unusual click behavior, abnormal or unusual click-through rates, other abnormal or unusual user device activities or interactions, or one or more combinations thereof for generating a recommendation.

By way of example, the recommendation system 104 can generate recommendation levels 104A (e.g., level 1, level 2, etc.) that indicate whether the one or more requests (e.g., from computing device 102) are malicious network traffic. For instance, a lower level may indicate that the one or more requests are not malicious network traffic and the higher levels may indicate the severity of the one or more requests as malicious network traffic (e.g., the higher the level the more severe). To illustrate, a request from computing device 102 may be an additional request from the computing device 102 after transmitting a high number of transaction requests to the API 108 within a threshold period of time, wherein the recommendation system 104 detected the high number of transaction requests using user interaction logs from a user device reputation database and a geolocation database. As another illustration, a request from computing device 102 may be an additional request from the computing device 102 after a high number of social media interactions within a threshold period of time, wherein the recommendation system 104 detected the high number of social media interactions using a user behavior analytics database and a device fingerprint database.

In some embodiments, the recommendation system 104 may receive, from a computing device different from computing device 102 that transmitted a first request determined as malicious network traffic, a second request corresponding to an API that is different from the API 108. Based on receiving the second request, the recommendation system 104 can generate a second recommendation corresponding to whether the second request is malicious network traffic based on historical and current network traffic associated with the different API. For example, the recommendation system 104 may use a user device reputation database and an advertisement fraudulent detection platform to generate a recommendation (e.g., one of recommendation levels 104A) that indicate that the second request is malicious network traffic. In some embodiments, the recommendation system 104 may provide a higher recommendation level of the recommendation levels 104A for the second request than for the first request.

Upon generating the recommendation via the recommendation system 104, the recommendation may be transmitted from the recommendation system 104 to the dynamic rate limiter 106. In some embodiments, different dynamic rate limiting rules may be applied by the dynamic rate limiter 106 based on the API. For example, the API 108 may have a first example rate limit 106A (e.g., lenient) and another API that is different from the API 108 may have a second example rate limit 106A (e.g., standard). In other embodiments, the API 108 may have a first example rate limit 106A (e.g., lenient) for a particular recommendation (e.g., for a recommendation level 1) and the API 108 may have another example rate limit 106A (e.g., standard) for a particular recommendation (e.g., for a recommendation level 2). For instance, the first example rate limit may include a lower window rate limit corresponding to a number of requests (e.g., API requests) permitted by a user device (e.g., computing device 102) during a particular period of time, and the other rate limit may include a higher window rate limit corresponding to a lower number of requests permitted by the user device. In yet another example, the first example rate limit may include a broader adaptive rate limit that adjusts based on API 108 traffic patterns during a particular period of time, and the other rate limit may include a narrower window adaptive rate limit corresponding to the API 108 traffic patterns.

In some embodiments, requests can be determined to be malicious network traffic based on applying a dynamic rate limiting rule to a particular recommendation (e.g., using a malicious network traffic management engine comprising the recommendation system 104 and the dynamic rate limiter 106). For example, upon determining that a request from the computing device 102 is malicious network traffic, the request and additional requests from the computing device 102 can be blocked (e.g., by the malicious network traffic management engine comprising the recommendation system 104 and the dynamic rate limiter 106). As another example, upon determining that a request from the computing device 102 is not malicious network traffic, the request and additional requests from the computing device 102 can be transmitted to the API 108.

In some embodiments, at least one of the additional requests from the computing device 102 can be blocked (e.g., by the malicious network traffic management engine comprising the recommendation system 104 and the dynamic rate limiter 106) upon determining that a request from the computing device 102 is malicious network traffic based on the at least one of the additional requests being a request for an interaction with another API that is different from the API 108. For example, the a different dynamic rate limiting rule can be applied, by the dynamic rate limiter 106, to the at least one of the additional requests such that the different dynamic rate limiting rule has a higher threshold number of requests than the dynamic rate limiting rule for the initial request transmitted by the computing device 102. By way of example, the dynamic rate limiting rule having the higher threshold number of requests can be an IP-based rate limit associated with the IP address of the computing device 102. As another example, the dynamic rate limiting rule having the higher threshold number of requests can be a concurrency-based rate limit corresponding to requests or concurrent connections associated with the IP address of the computing device 102.

In some embodiments, the dynamic rate limiter 106 can adjust the dynamic rate limiting rule for a particular user device or user account based on a change to a recommendation generated by the recommendation system 104 or a change to the network traffic associated with the API 108. For instance, the recommendation system 104 may lower a recommendation level 104A for a particular user device or user account (e.g., based on the user device no longer being jailbroken), or the network traffic associated with the API 108 may no longer be at a peak network traffic time frame. If the network traffic associated with the API 108 has been reduced by a threshold volume, the dynamic rate limiter 106 can, in some embodiments, automatically lower the dynamic rate limiting rule (e.g., to lenient from stringent) for particular types of requests. As another example, if the network traffic associated with the API 108 has increased to over a threshold volume of network traffic, the dynamic rate limiter 106 can, in some embodiments, automatically increase the dynamic rate limiting rule (e.g., from standard to stringent) for particular types of requests.

Figure 2:
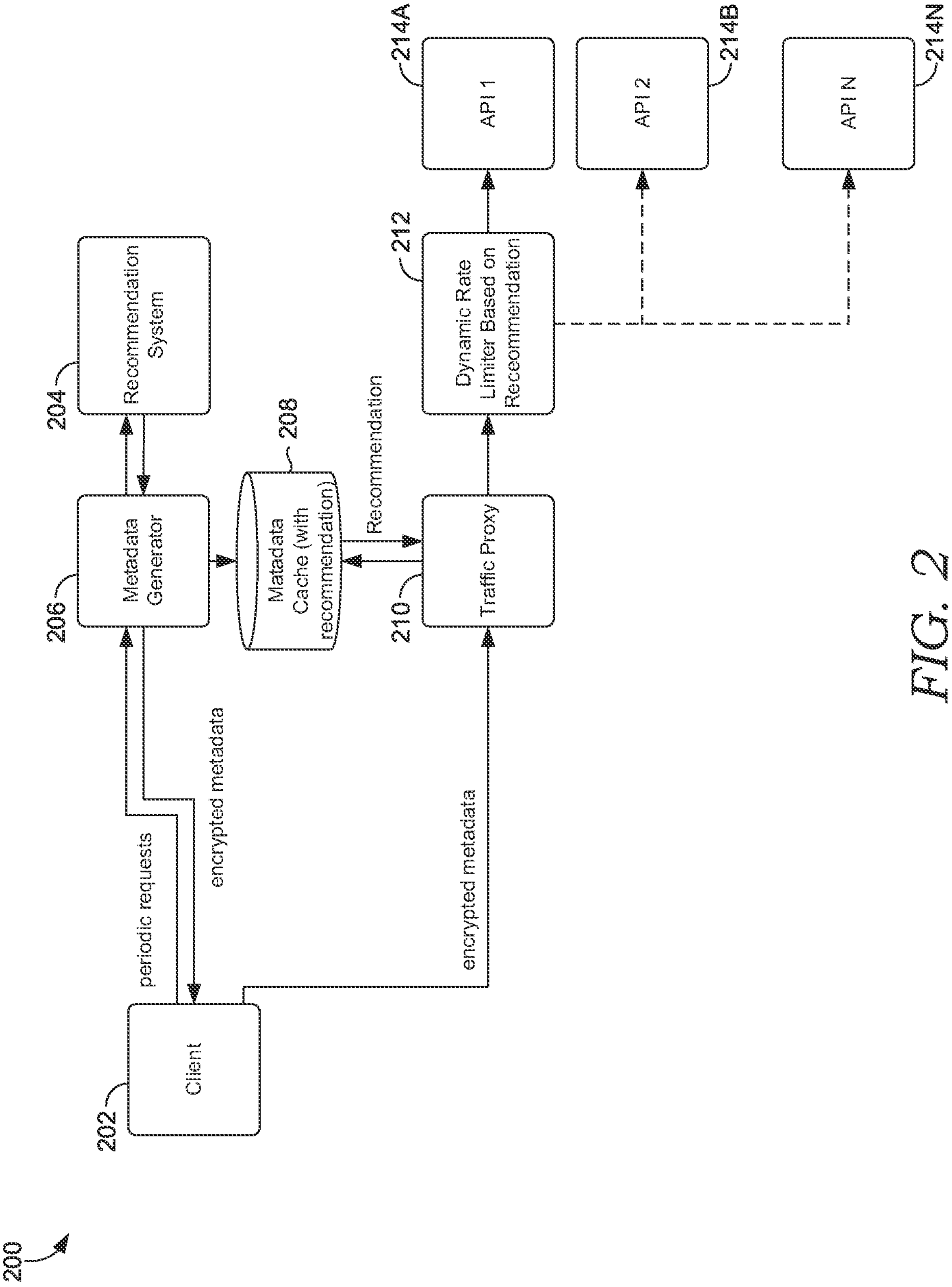
FIG. 2 illustrates another example block diagram for generating network traffic recommendations and applying a dynamic rate limiting rule, in accordance with an embodiment described herein.

FIG. 2 depicts example block diagram 200 for generating network traffic recommendations and applying a dynamic rate limiting rule. Example block diagram 200 includes client 202 (e.g., computing device 102 of FIG. 1 or computing device 500 of FIG. 5), recommendation system 204, metadata generator 206, metadata cache 208, traffic proxy 210, dynamic rate limiter 212, and APIs 214A, 214B, and 214N. Other embodiments of this example block diagram may include less or additional APIs, additional clients, additional databases, additional metadata generators, another traffic proxy, etc.

In embodiments, the recommendation system 204 receives a request transmitted by the client 202. In some embodiments, the recommendation system 204 can receive periodic requests transmitted by the client 202 (e.g., a first periodic request, a second periodic request, etc.) corresponding to one or more of the API 214A, API 214B, and API 214N. In some embodiments, the recommendation system 204 can receive another request (e.g., a second request, a third request, etc.) corresponding to one or more of the API 214A, API 214B, and API 214N, wherein this other request is received from a different computing device than the client 202. Based on receiving the one or more requests, the recommendation system 204 can generate a recommendation for each request, the recommendation corresponding to whether the corresponding request is malicious network traffic (e.g., based on the historical and current network traffic associated with one or more of the API 214A, API 214B, and API 214N).

Based on generating a recommendation via the recommendation system 204 (e.g., an auxiliary recommendation system that is separate from the dynamic rate limiter 212 and traffic proxy 210), the metadata generator 206 can generate encrypted metadata for the recommendation indicating whether the request is malicious network traffic. In some embodiments, the metadata generator 206 can encrypt the recommendation level 104A of FIG. 1. The metadata generator 206 can encrypt the recommendation within metadata prior to applying a dynamic rate limiting rule via the dynamic rate limiter 212, prior to the traffic proxy 210 receiving the recommendation (e.g., encrypted within the metadata), and prior to blocking the request or transmitting the request to the API 214A, API 214B, or API 214N.

In some embodiments, the metadata generator 206 is different than and separate from the recommendation system 204. In some embodiments, the metadata generator 206 can include one or more encryption components (e.g., implemented in silicon or stored on computer readable media in which one or more processors can perform operations associated with the encryption). The metadata generator 206 may encrypt the recommendation or portions of the metadata including the recommendation using an end-to-end encryption technique, an advanced encryption standard, a data encryption standard, a cypher algorithm, ciphertext, a symmetric block cipher, a rivest-shamir-adleman encryption algorithm, elliptic curve cryptography, another type of encryption protocol, or one or more combinations thereof. In embodiments, the metadata may include a file name and file size that is unencrypted and the recommendation that is encrypted. In some embodiments, the encrypted recommendation may be a searchable encryption or a format-preserving encryption.

Based on encrypting the recommendation via the metadata generator 206, the metadata including the encrypted recommendation can be transmitted back to the client 202 for subsequent transmission to the traffic proxy 210 or transmitted to the metadata cache 208. In embodiments wherein the encrypted recommendation is transmitted for caching at the metadata cache 208, the metadata cache 208 may include one or more memory caches, one or more disk caches (e.g., solid state disk memory), one or more distributed caches across multiple nodes, one or more object caches, one or more page caches, one or more content delivery networks, one or more web browser caches, one or more query result caches, other types of data stores, or one or more combinations thereof.

In some embodiments, the metadata including the encrypted recommendation can be stored at the metadata cache 208 for a period of time that is based on a network traffic flow associated with one or more of the API 214A, API 214B, or API 214N. Additionally or alternatively, the period of time in which the metadata is cached can be based on a network traffic flow associated with one or more of the traffic proxy 210 (e.g., wherein the encrypted metadata is cached for a period of time that is based on a traffic flow associated with the proxy layer before receipt by the proxy layer) and the dynamic rate limiter 212 (e.g., stored for a period of time before receipt by the dynamic rate limiter 212). In embodiments, the dynamic rate limiting rule is applied via the dynamic rate limiter 212 after caching the encryption of the recommendation generated by the recommendation system 204.

The traffic proxy 210 can receive the encrypted metadata for the recommendation via retrieval from the metadata cache 208 or from the client 202. The traffic proxy 210 may include one or more proxy servers, which may be capable of searching or filtering metadata or encrypted recommendations within the metadata at the metadata cache 208, managing dynamic rate limiting rules for one or more of API 214A, 214B, and 214N, load balancing the requests from the client 202 and other client devices, firewall implementation, decrypting the encrypted recommendations, performing translations between network protocols, compressing the decrypted recommendations or compressing other types of data associated with requests, performing other proxy-related tasks, or one or more combinations thereof. In some embodiments, the traffic proxy 210 can distinguish the encrypted recommendation from other parts of the metadata and distinguish encrypted recommendations for API 214A from encrypted recommendations for API 214B.

Based on providing the encrypted metadata for the recommendation to the traffic proxy 210, a dynamic rate limiting rule can be applied to the recommendation using the dynamic rate limiter 212. In some embodiments, the dynamic rate limiter 212 is a separate computing system from the traffic proxy 210. In other embodiments, the traffic proxy 210 can provide the dynamic rate limiting rule to the recommendation for determining whether a request is malicious network traffic. Different dynamic rate limiting rules can be applied to different recommendations based on indications provided by the corresponding API, the level of the recommendation (e.g., more stringent dynamic rate limiting rules for a higher level recommendation), historical or current network traffic trends, etc. For example, a second dynamic rate limiting rule may have a lower threshold number of requests from an individual computing device than the dynamic rate limiting rule for a first request. In some embodiments, the dynamic rate limiter 212 can change the rate limiting rule for a particular recommendation associated with a particular API based on indications provided by a computing device of the API.

Based on applying the dynamic rate limiting rule via the dynamic rate limiter 212 for each recommendation from the client 202 or from other client devices, the requests may either be blocked or transmitted to one or more of the API 214A, 214B, and 214N. For example, a request can be blocked upon determining that the request is malicious network traffic. In some embodiments, at least one of a plurality of requests (e.g., from the client 202 or another computing device) can be blocked based on applying a dynamic rate limiting rule or an adjusted dynamic rate limiting rule for each recommendation (e.g., wherein the adjusted dynamic rate limiting rule is based on receiving an indication (e.g., from an API computing device) to the adjust the dynamic rate limiting rule to a lower threshold number of requests from the client 202 or to adjust the dynamic rate limiting rule to a higher threshold number of requests).

FIG. 3 illustrates example user interface 300 for applying or adjusting dynamic rate limits for determining whether to block one or more requests. In example user interface 300, a high rate limit threshold for lower risk requests (e.g., requests associated with a particular user or email account)

may be set at 50, a medium rate limit threshold for medium risk requests (e.g., requests associated with a particular user or email account) may be set at 100, and a low rate limit threshold for higher risk requests (e.g., requests associated with a particular user or email account) may be set at 1000. For example, the 3,864 requests were blocked using the high rate limit threshold (e.g., 50 requests threshold) upon detection of the 51 transmitted requests. In other embodiments, other dynamic rate limits may be used.

Example Flow Chart

Figure 4:
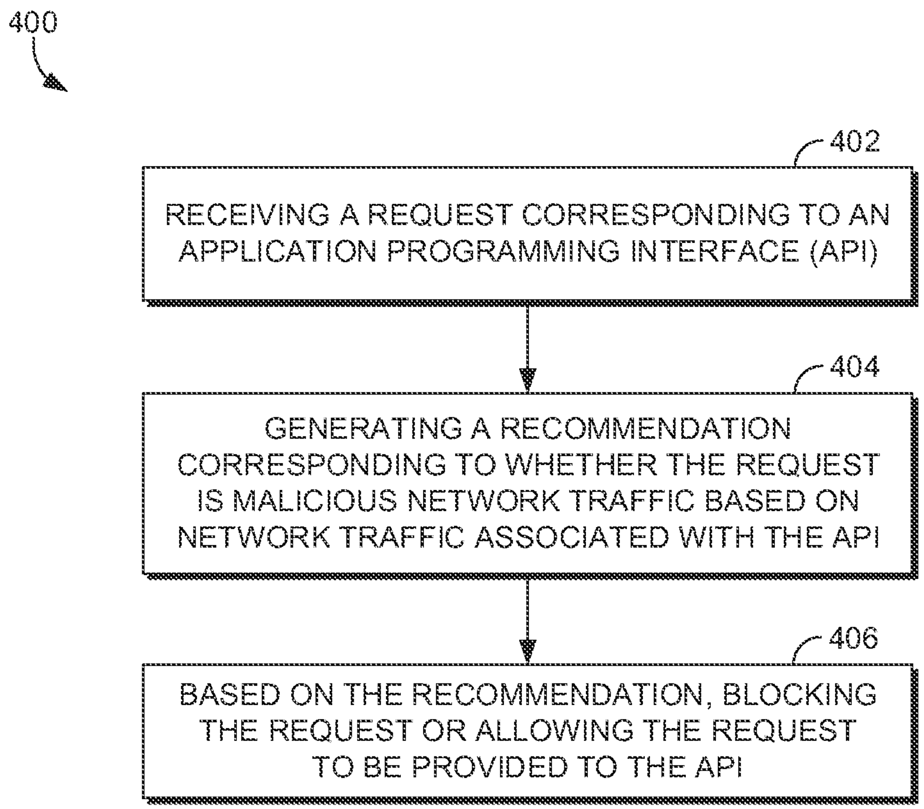
FIG. 4 illustrates an example flowchart for generating recommendations corresponding to network traffic (e.g., generated by a malicious network traffic recommendation engine), in accordance with an embodiment described herein.

Flowchart 400 of FIG. 4 begins at step 402 with receiving a request corresponding to an application programming interface (API). In some embodiments, the request can include an API request received from a computing device (e.g., a laptop, drone, internet of things device, smartphone, server, etc.). In some embodiments, the computing device has a detectable internet protocol (IP) address. In some embodiments, the request may be a Hypertext Transfer Protocol (HTTP) request, a request to download a file, a request for uploading operations, a particular search query request for a particular API, an email request (e.g., a simple mail transfer protocol, etc.), a file transfer protocol request, another type of request, or one or more combinations thereof. The request can be received by a malicious network traffic recommendation engine (e.g., one or more backend or server-side devices, one or more edge servers, recommendation system 104 of FIG. 1, recommendation system 204 of FIG. 2) configured to receive computing device requests and coordinate fulfillment of those requests.

In some embodiments, the malicious network traffic recommendation engine can comprise one or more computing devices, such as computing device 500 of FIG. 5. In some embodiments, the malicious network traffic recommendation engine can be a distributed computing environment encompassing multiple computing devices located at the same physical geographical location or at different physical geographical locations. In some embodiments, the malicious network traffic recommendation engine may include one or more database management systems that perform querying operations or operations for updating, deleting, or inserting particular data. By way of example, the malicious network traffic recommendation engine may be configured to receive and process structured query language associated with requests, unstructured query language associated with requests, other formats of query language associated with requests, or one or more combinations thereof. The malicious network traffic recommendation engine can manage network traffic for one or more APIs and provide recommendations for one or more of the APIs.

At step 404, one or more recommendations, for various requests corresponding to the one or more APIs, can be generated (e.g., by the malicious network traffic recommendation engine). The malicious network traffic recommendation engine may include one or more auxiliary models (e.g., machine learning model(s), neural network(s), etc.) for generating the recommendations, the auxiliary models being trained using training data from one or more databases (e.g., external databases, databases storing failed login attempts, databases storing login attempts from different user devices, databases storing email transmission rates from a particular user device, databases storing file upload or download rates, databases storing file transfer rates, databases storing geolocation information request rates, etc.) for continual improvement to the accuracy of the recommendations generated by the malicious network traffic recommendation engine. For example, the one or more external databases used for training the models may have stored software instructions and historical monitored network traffic for a particular industry. In some embodiments, the models can be trained using an open source network monitoring platform (e.g., that monitors one or more particular metrics associated with particular network traffic).

The recommendation engine can generate recommendations for one or more APIs based on the historical and current network traffic trends associated with an API. For example, the recommendation engine may identify a first trend for a first API during a first time period and a second trend for the first API during a second time period and may generate a recommendation based on a comparison of the first trend to the second trend. As another example, the recommendation engine may determine that the first API and a second API have similar historical network traffic trends during a particular period of time and that the first API and a second API have similar API request loads, and based on this determination, the recommendation engine may use the historical network traffic trends of both the first API and the second API for generating recommendations for the first API. In some embodiments, the recommendation engine may generate recommendations for the first API based on both historical and current network traffic of the first API.

In some example embodiments, the historical and current network traffic of the first API can include a number of HTTP requests received from a particular user device or a plurality of user devices during a time period, a number of requests to download a file size (e.g., megabytes, gigabytes, terabytes, etc.) over a file size threshold, a number of requests to download a file size a particular file size range, a request for uploading operations having an upload size above an upload size threshold, an email request having a particular file size, a file transfer protocol request having a particular file size, a request for uploading or downloading operations having an upload or download speed below a threshold (e.g., in megabits per second, gigabits per second, terabits per second, etc.), a request for uploading operations having a particular upload throughput, another type of historical and current network traffic trend, or one or more combinations thereof.

In some embodiments, the current network traffic of the first API used for generating the recommendation may include a comparison of the network traffic requests during a recent period of time to an overall total volume of network traffic requests for the first API. In some embodiments, the recommendation can be generated by comparing the current network traffic (e.g., during the past hour) to the historical corresponding network traffic (e.g., during that hour one week ago, during that hour one month ago, etc.). As another example, the recommendation for a request corresponding to the first API may be generated by comparing the current and historical network traffic for the first API to the current and historical network traffic for other API(s) within the same industry (e.g., network traffic trends for particular cryptocurrency requests or e-commerce requests). In yet another example, the recommendation can be generated using historical and current network traffic corresponding to an IP address, a particular user account associated with user credentials, a particular volume or type of payload content associated with the historical and current network traffic, other types of historical and current network traffic, or one or more combinations thereof.

In some embodiments, the recommendation may indicate whether or not a particular request is malicious network traffic (e.g., based on historical and current network traffic associated with one or more APIs). For example, the recommendation may indicate that the request is very likely to be malicious network traffic or that the request is somewhat likely to be malicious network traffic. For instance, a recommendation indicating that the request is somewhat likely to be malicious network traffic may be based on the recommendation system identifying some unusual activity, but not identifying any activity that is definitively associated with malicious network traffic. Some examples of recommendations indicating a request as malicious network traffic may include a computing device that initiated a particular number of a particular type of activity (e.g., transmitting a malicious file), an account sign-in on a computing device unaffiliated with the account, an indication of a second and unaffiliated user utilizing a particular computer device, jailbreaking or rooting associated with a particular computing device, information tampering software activity, other types of similar activity, or one or more combinations thereof.

In response to generating the recommendation, encrypted metadata can be generated for the recommendation. For example, an encryption system that is different than the malicious network traffic recommendation engine can encrypt the recommendation within metadata. In embodiments, the metadata may include a file name, file size, creation date, other metadata features, or one or more combinations thereof, and the recommendation may be encrypted using an end-to-end encryption technique (i.e., encrypting the entirety of the metadata) or one or more encryption layers for the recommendation while leaving the other metadata features unencrypted. In some embodiments, the encrypted recommendation may be a searchable encryption, a format-preserving encryption, an attribute-based encryption, a proxy re-encryption, another type of encryption, or one or more combinations thereof. In some embodiments, the encrypted recommendation may include a recommendation level (e.g., how risky a user or computing device is), user device identifiers, particular user account identifiers, other types of recommendation content, or one or more combinations thereof. In some embodiments, the recommendation is asymmetrically encrypted. In some embodiments, the recommendation is encrypted using an advanced encryption standard, a data encryption standard, a symmetric block cipher, a rivest-shamir-adleman encryption algorithm, elliptic curve cryptography, another type of encryption protocol, or one or more combinations thereof.

Based on encrypting the recommendation, the metadata including the encrypted recommendation can be cached for a period of time that is based on a network traffic flow associated with the API, proxy layer, another traffic flow measurement, or one or more combinations thereof, before the metadata including the encrypted recommendation is received by the proxy layer. By way of example, the cached period of time can be based on measurements of the network traffic at the one or more servers of the proxy layer. For instance, the network traffic at the one or more proxy layers may be measured using one or more proxy server logs, packet sniffing (e.g., analysis of data packets through the proxy layer indicating content and structure of the network traffic), proxy server metrics monitored using proxy server software, flow data analysis associated with IP addresses, ports, amounts of data transfers, etc., deep packet inspection, a bandwidth monitoring tool, a security information and event management tool (e.g., for aggregated log data), another type of proxy traffic network measurement technique, or one or more combinations thereof.

By way of another example, the cached period of time can be based on measurements of the network traffic at the one or more APIs. For instance, the network traffic at the one or more APIs may be measured using one or more API gateway analytic tools (e.g., for monitoring request times, response times, error rates, usage patterns, etc.), API logging data associated with incoming requests, responses, etc., API packet analytics for traffic between clients and API server(s), load testing data (e.g., such as load performance data), request counting tools, other types of network traffic tools, or one or more combinations thereof. As indicated above, the cached period of time can be based on measurements of the network traffic at the one or more APIs, the one or more proxy servers, or one or more combinations thereof.

In some embodiments, one or more portions of the metadata including the encrypted recommendation can be in-memory cached, database cached (e.g., one or more separate databases for caching the encrypted recommendation), cached at one or more proxy servers, cached across one or more edge locations, cached within an application code, cached via a distributed caching mechanism for multi-node access, cached via another caching technique, or one or more combinations thereof. In some embodiments, the cached data is stored in one or more high-speed memory (e.g., solid state disk memory). As another example, in some embodiments, the cached data is stored in one or more random access memory, one or more central processing unit chips, one or more hard disk drives, one or more non-volatile dual in-line memory modules, a flash memory, another type of memory component, or one or more combinations thereof.

Based on caching the metadata including the encrypted recommendation, a proxy layer can receive the metadata including the encrypted recommendation for application of a dynamic rate limiting rule. For example, the proxy layer may function as an intermediary between client devices and the APIs for which particular requests are either blocked or permitted to be transmitted to the APIs via the malicious network traffic management engine comprising the auxiliary recommendation system and the proxy layer. The proxy layer may include one or more proxy servers, which may be capable of storing the cached metadata including the encrypted recommendation, filtering cached metadata, managing a plurality of dynamic rate limiting rules for various APIs, performing other proxy-related tasks, or one or more combinations thereof. In some embodiments, the proxy layer may include a Hypertext Transfer Protocol over Secure Socket Layer or Transport Layer Security. In some embodiments, the proxy layer may be utilized to open a WebSocket for client-proxy communications. In some embodiments, the proxy layer may distinguish tokened requests from other requests based on the metadata including the encrypted recommendation, identify a header associated with the metadata including the encrypted recommendation, identify other components of the metadata including the encrypted recommendation, or one or more combinations thereof.

In some embodiments, different dynamic rate limiting rules may be applied based on the API. Examples of rate limiting rules may include a fixed window rate limit corresponding to a maximum number of requests permitted by a user device or user account during a particular period of time, a sliding window rate limit corresponding to a moving time window, a token bucket algorithm corresponding to a particular number of tokens or a particular token for a particular request, a leaky bucket algorithm corresponding to requests being bucketed for processing upon availability at the proxy layer, an adaptive rate limit that adjusts based on traffic patterns, an IP-based rate limit associated with the IP address of an incoming request, a user-based rate limit, an endpoint specific rate limit, a geographical rate limit based on a geographical location of the client device or a server location for an API, a token rate limit, a concurrency-based rate limit corresponding to requests or concurrent connections associated with an IP address or user account, another type of rate limit, or one or more combinations thereof.

By way of example, in some embodiments, the dynamic rate limiting rule applied to a first recommendation for an API may be a different rate limiting rule applied to a second recommendation for the API. For instance, the first recommendation may have been transmitted during a time of higher network traffic than when the second recommendation was transmitted. In some embodiments, the dynamic rate limiting rule applied to a first recommendation for a first API may be a different rate limiting rule applied to a second recommendation for a second API. For instance, the dynamic rate limiting rule applied to a first recommendation may be a higher user-based rate limit than the rate limiting rule applied to the second recommendation. As another example, a dynamic rate limiting rule applied to a first recommendation may be determined by a computing device corresponding to an API and the rate limiting rule applied to a subsequent recommendation may be a different rate limiting rule indicated by the computing device.

At step 406, a request can be blocked based on determining that the request is malicious network traffic. In addition, additional requests from a computing device that transmitted the request that is malicious network traffic can also be blocked. In some embodiments, other requests that are determined to not be malicious network traffic can be provided to the API in which the request corresponds to.

Example Computing Device

Having described an overview of embodiments of the present technology, an example operating environment in which embodiments of the present technology may be implemented is described below in order to provide a general context for various aspects. Referring initially to FIG. 5, in particular, an example operating environment for implementing embodiments of the present technology is shown and designated generally as computing device 500. Computing device 500 is but one example of a suitable computing environment and is not intended to suggest any limitation as to the scope of use or functionality of the technology. Neither should computing device 500 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 502 that directly or indirectly couples the following devices: memory 504, one or more processors 506, one or more presentation components 508, input/output ports 510, input/output components 512, and illustrative power supply 514. Bus 502 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 5 is merely illustrates an example computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and other transmissions. Combinations of any of the above should also be included within the scope of computer-readable media.

Memory 504 includes computer storage media in the form of volatile or nonvolatile memory. The memory 504 may be removable, non-removable, or a combination thereof. Example hardware devices include solid-state memory, hard drives, optical-disc drives, etc. Computing device 500 includes one or more processors that read data from various entities such as memory 504 or I/O components 512. Presentation component(s) 508 present data indications to a user or other device. Examples of presentation components include a display device, speaker, printing component, vibrating component, etc.

I/O ports 510 allow computing device 500 to be logically coupled to other devices including I/O components 512, some of which may be built in. Illustrative components include a microphone, joystick, game pad, satellite dish, scanner, printer, and so forth.

Embodiments described above may be combined with one or more of the specifically described alternatives. In particular, an embodiment that is claimed may contain a reference, in the alternative, to more than one other embodiment.

The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media.

In addition, words such as "a" and "an," unless otherwise indicated to the contrary, include the plural as well as the singular. Thus, for example, the constraint of "a feature" is satisfied where one or more features are present.

Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: A computer-implemented method comprising: receiving a request corresponding to an application programming interface (API); generating a recommendation corresponding to whether the request is malicious network traffic based on historical and current network traffic associated with the API; applying a dynamic rate limiting rule to the recommendation; based on applying the dynamic rate limiting rule, determining that the request is malicious network traffic; and blocking the request in response to the request being the malicious network traffic.

Aspect 2: Aspect 1, further comprising blocking additional requests from a computing device that transmitted the request corresponding to the API based on determining that the request is malicious network traffic.

Aspect 3: Aspect 1 or 2, further comprising: receiving, from a computing device different from another computing device that transmitted the request determined as malicious network traffic, a second request corresponding to a different API; generating a second recommendation corresponding to whether the second request is malicious network traffic based on historical and current network traffic associated with the different API; applying a different dynamic rate limiting rule to the second recommendation; based on applying the different dynamic rate limiting rule, determining that the second request is malicious network traffic; and based on determining that the second request is malicious network traffic, blocking additional requests from the computing device.

Aspect 4: Aspect 1, 2, or 3, wherein at least one of the additional requests from the computing device being blocked is a request for interacting with a third API, and wherein the different dynamic rate limiting rule for the second request has a higher threshold number of requests than the dynamic rate limiting rule for the request.

Aspect 5: Aspect 1, 2, 3, or 4, further comprising: prior to blocking the request, generating encrypted metadata for the recommendation; providing the encrypted metadata for the recommendation, corresponding to the request being malicious network traffic, to a proxy layer; and applying the dynamic rate limiting rule based on providing the encrypted metadata to the proxy layer.

Aspect 6: Aspect 1, 2, 3, 4, or 5, wherein the encrypted metadata is cached for a period of time that is based on a traffic flow associated with the proxy layer before receipt by the proxy layer.

Aspect 7: Aspect 1, 2, 3, 4, 5, or 6, further comprising: receiving a second request corresponding to the API, wherein the second request is received from a different computing device than the request; generating a second recommendation corresponding to whether the second request is malicious network traffic based on the historical and current network traffic associated with the API; applying the dynamic rate limiting rule to the second recommendation; based on applying the dynamic rate limiting rule to the second recommendation, determining that the second request is non-malicious network traffic; and permitting the second request to be provided to the API in response to the second request being a non-malicious network traffic.

Aspect 8: Aspect 1, 2, 3, 4, 5, 6, or 7, further comprising: prior to permitting the second request to be provided to the API, generating encrypted metadata for the second recommendation; providing the encrypted metadata for the second recommendation to a proxy layer; and applying the dynamic rate limiting rule to the second recommendation based on providing the encrypted metadata for the second recommendation to the proxy layer.

Aspect 9: A computer system comprising: one or more processors; and a computer storage medium storing computer-useable instructions that, when used by the one or more processors, causes the computer system to perform operations comprising: receiving, from a computing device, a request corresponding to an application programming interface (API); generating, via a malicious network traffic recommendation engine, a recommendation corresponding to whether the request is malicious network traffic based on historical and current network traffic; determining whether the request is malicious network traffic using the recommendation from the malicious network traffic recommendation engine and applying a dynamic rate limiting rule; and blocking the request in response to determining that the request is the malicious network traffic.

Aspect 10: Aspect 9, further comprising blocking additional requests corresponding to other APIs from the computing device based on determining that the request is the malicious network traffic.

Aspect 11: Aspect 9 or 10, further comprising: based on generating the recommendation and prior to blocking the request, generating encrypted metadata for the recommendation; providing the encrypted metadata for the recommendation from the malicious network traffic recommendation engine to a proxy layer; and applying the dynamic rate limiting rule to the recommendation based on providing the encrypted metadata to the proxy layer.

Aspect 12: Aspect 9, 10, or 11, wherein the encrypted metadata is cached for a period of time that is based on a traffic flow associated with the API and the proxy layer before receipt by the proxy layer.

Aspect 13: Aspect 9, 10, 11, or 12, further comprising: receiving, from another computing device, a second request corresponding to a second API; generating, via the malicious network traffic recommendation engine, a second recommendation corresponding to whether the second request is malicious network traffic based on historical and current network traffic associated with a plurality of APIs including the second API; determining that the second request is not malicious network traffic using the second recommendation from the malicious network traffic recommendation engine and applying a second dynamic rate limiting rule, wherein the second dynamic rate limiting rule has a lower threshold number of requests from an individual computing device than the dynamic rate limiting rule for the request; and based on determining that the second request is not malicious network traffic, providing the second request to the second API.

Aspect 14: Aspect 9, 10, 11, 12 or 13, further comprising: receiving an indication to the adjust the dynamic rate limiting rule to a lower threshold number of requests from an individual computing device; receiving a plurality of requests corresponding to the API, each of the plurality of requests received from one or more computing devices other than the computing device that transmitted the request; generating, via the malicious network traffic recommendation engine, a recommendation for each of the plurality of requests based on historical and current network traffic associated with a plurality of APIs including the API; based on the recommendation generated for each of the plurality of requests, applying the adjusted dynamic rate limiting rule for each recommendation; and blocking at least one of the plurality of requests based on applying the adjusted dynamic rate limiting rule for each recommendation.

Aspect 15: One or more non-transitory computer storage media storing computer-useable instructions that, when used by one or more processors, cause the one or more processors to perform operations comprising: receiving a request corresponding to an application programming interface (API); generating a recommendation corresponding to whether the request is malicious network traffic based on historical and current network traffic; based on the recommendation, determining whether the request is malicious network traffic by applying a dynamic rate limiting rule; and blocking the request in response to the request being the malicious network traffic.

Aspect 16: Aspect 15, wherein the historical and current network traffic used for the recommendation include historical and current network traffic for the API and at least one other API.

Aspect 17: Aspect 15 or 16, wherein the request is received from a computing device based on user credentials provided to the computing device.

Aspect 18: Aspect 15, 16, or 17, wherein the dynamic rate limiting rule is provided by a computing device corresponding to the API.

Aspect 19: Aspect 15, 16, 17, or 18, wherein the dynamic rate limiting rule is applied after caching an encryption of the recommendation.

Aspect 20: Aspect 15, 16, 17, 18, or 19, further comprising generating recommendations in real time for additional requests corresponding to the API and continuously updating the historical and current network traffic used for generating the recommendations within a threshold period of time.

What is claimed is:

1. A computer-implemented method comprising:

receiving a request corresponding to an application programming interface (API);

generating a recommendation corresponding to whether the request is malicious network traffic based on historical and current network traffic associated with the API;

applying a dynamic rate limiting rule to the recommendation based on encrypted metadata that is generated for the recommendation and communicated to a proxy layer, wherein applying the dynamic rate limiting rule supports selectively blocking or permitting the request based on part on the encrypted metadata provided via the proxy layer;

based on applying the dynamic rate limiting rule, determining that the request is the malicious network traffic; and blocking the request in response to the request being the malicious network traffic.

2. The computer-implemented method of claim 1, further comprising blocking additional requests from a computing device that transmitted the request corresponding to the API based on determining that the request is the malicious network traffic.

3. The computer-implemented method of claim 1, further comprising:

receiving, from a computing device different from another computing device that transmitted the request determined as the malicious network traffic, a second request corresponding to a different API;

generating a second recommendation corresponding to whether the second request is the malicious network traffic based on historical and current network traffic associated with the different API;

applying a different dynamic rate limiting rule to the second recommendation;

based on applying the different dynamic rate limiting rule, determining that the second request is the malicious network traffic; and blocking additional request from the computing device in response to the second request being the malicious network traffic.

4. The computer-implemented method of claim 3, wherein at least one of the additional requests from the computing device being blocked is a request for interacting with a third API, and wherein the different dynamic rate limiting rule for the second request has a higher threshold number of requests than the dynamic rate limiting rule for the request.

5. The computer-implemented method of claim 1, wherein the encrypted metadata is cached for a period of time that is based on a traffic flow associated with the proxy layer before receipt by the proxy layer.

6. The computer-implemented method of claim 1, further comprising:

receiving a second request corresponding to the API, wherein the second request is received from a different computing device than the request;

generating a second recommendation corresponding to whether the second request is the malicious network traffic based on the historical and current network traffic associated with the API;

applying the dynamic rate limiting rule to the second recommendation;

based on applying the dynamic rate limiting rule to the second recommendation, determining that the second request is non-malicious network traffic; and permitting the second request to be provided to the API in response to the second request being a non-malicious network traffic.

7. The computer-implemented method of claim 6, further comprising:

prior to permitting the second request to be provided to the API, generating encrypted metadata for the second recommendation;

providing the encrypted metadata for the second recommendation to a proxy layer; and applying the dynamic rate limiting rule to the second recommendation based on providing the encrypted metadata for the second recommendation to the proxy layer.

8. A computer system comprising:

one or more processors; and a computer storage medium storing computer-useable instructions that, when used by the one or more processors, causes the computer system to perform operations comprising:

receiving, from a computing device, a request corresponding to an application programming interface (API);

generating, via a malicious network traffic recommendation engine, a recommendation corresponding to whether the request is malicious network traffic based on historical and current network traffic;

determining whether the request is the malicious network traffic using the recommendation from the malicious network traffic recommendation engine and applying a dynamic rate limiting rule to the recommendation based on encrypted metadata that is generated for the recommendation and communicated to a proxy layer, wherein applying the dynamic rate limiting rule supports selectively blocking or permitting the request based on part on the encrypted metadata provided via the proxy layer; and blocking the request in response to determining that the request is the malicious network traffic.

9. The computer system of claim 8, further comprising blocking additional requests corresponding to other APIs from the computing device based on determining that the request is the malicious network traffic.

10. The computer system of claim 8, wherein the encrypted metadata is cached for a period of time that is based on a traffic flow associated with the API and the proxy layer before receipt by the proxy layer.

11. The computer system of claim 10, further comprising:

receiving, from another computing device, a second request corresponding to a second API;

generating, via the malicious network traffic recommendation engine, a second recommendation corresponding to whether the second request is malicious network traffic based on historical and current network traffic associated with a plurality of APIs including the second API;

determining that the second request is a non-malicious network traffic using the second recommendation from the malicious network traffic recommendation engine and applying a second dynamic rate limiting rule, wherein the second dynamic rate limiting rule has a lower threshold number of requests from an individual computing device than the dynamic rate limiting rule for the request; and based on determining that the second request is the non-malicious network traffic, providing the second request to the second API.

12. The computer system of claim 8, further comprising:

receiving an indication to adjust the dynamic rate limiting rule to a lower threshold number of requests from an individual computing device;

receiving a plurality of requests corresponding to the API, each of the plurality of requests received from one or more computing devices other than the computing device that transmitted the request;

generating, via the malicious network traffic recommendation engine, a recommendation for each of the plurality of requests based on historical and current network traffic associated with a plurality of APIs including the API;

based on the recommendation generated for each of the plurality of requests, applying the adjusted dynamic rate limiting rule for each recommendation; and blocking at least one of the plurality of requests based on applying the adjusted dynamic rate limiting rule for each recommendation.

13. One or more non-transitory computer storage media storing computer-useable instructions that, when used by one or more processors, cause the one or more processors to perform operations comprising:

receiving a request corresponding to an application programming interface (API);

generating a recommendation corresponding to whether the request is malicious network traffic based on historical and current network traffic;

based on the recommendation, determining whether the request is the malicious network traffic by applying a dynamic rate limiting rule to the recommendation based on encrypted metadata that is generated for the recommendation and communicated to a proxy layer, wherein applying the dynamic rate limiting rule supports selectively blocking or permitting the request based on part on the encrypted metadata provided via the proxy layer;; and blocking the request in response to the request being the malicious network traffic.

14. The one or more non-transitory computer storage media of claim 13, wherein the historical and current network traffic used for the recommendation include historical and current network traffic for the API and at least one other API.

15. The one or more non-transitory computer storage media of claim 13, wherein the request is received from a computing device based on user credentials provided to the computing device.

16. The one or more non-transitory computer storage media of claim 13, wherein the dynamic rate limiting rule is provided by a computing device corresponding to the API.

17. The one or more non-transitory computer storage media of claim 13, wherein the dynamic rate limiting rule is applied after caching an encryption of the recommendation.

18. The one or more non-transitory computer storage media of claim 13, further comprising generating recommendations in real time for additional requests corresponding to the API and continuously updating the historical and current network traffic used for generating the recommendations within a threshold period of time.

* * * * *